United States Patent [19]

Suzuki

[11] 4,415,058
[45] Nov. 15, 1983

[54] FOUR-WHEEL DRIVE SYSTEM FOR A WHEELED VEHICLE

[75] Inventor: Kunihiko Suzuki, Sagamihara, Japan
[73] Assignee: Nissan Motor Company, Limited, Yokohama, Japan
[21] Appl. No.: 335,680
[22] Filed: Dec. 30, 1981
[30] Foreign Application Priority Data Jan. 9, 1981 [JP] Japan .................................. 56-2527

[51] Int. Cl.$^3$ ............................................ B60K 17/34
[52] U.S. Cl. ..................................... 180/247; 180/297
[58] Field of Search .............. 180/248, 249, 297, 250, 180/233, 247; 74/694, 700, 701

[56] References Cited

U.S. PATENT DOCUMENTS

| 2,595,494 | 5/1952 | Stratman | 180/297 |
| 3,113,471 | 12/1963 | Gregory | 74/701 |
| 3,993,152 | 11/1976 | Fogelberg | 180/44 R |

FOREIGN PATENT DOCUMENTS

| 55-83119 | 6/1980 | Japan . | |
| 2064449 | 6/1981 | United Kingdom | 180/248 |
| 2074517 | 11/1981 | United Kingdom . | |

Primary Examiner—John A. Pekar
Assistant Examiner—D. Lynn Fugate
Attorney, Agent, or Firm—Lane, Aitken & Kananen

[57] ABSTRACT

A four-wheel drive system for a wheeled vehicle, comprising a power unit having an output shaft extending in a lateral direction of the vehicle, a power transmission gear unit including transmission input and output shafts each extending in a lateral direction of the vehicle; and a power distribution gear unit comprising a power distribution shaft having an axis of rotation in a lateral direction of the vehicle and operative to split into two components the driving power carried on the output shaft of the power transmission gear unit, one of the power components being transmitted through a final reduction gear assembly and a wheel drive differential gear assembly to, for example, front road wheels, the other of the driving power components being transmitted to, for example, rear road wheels by way of a right-angle power transfer gear assembly including a driven gear having an axis of rotation in a fore-and-aft direction of the vehicle, the power distribution gear unit further comprising a low-and-high speed shifting clutch mechanism.

5 Claims, 2 Drawing Figures

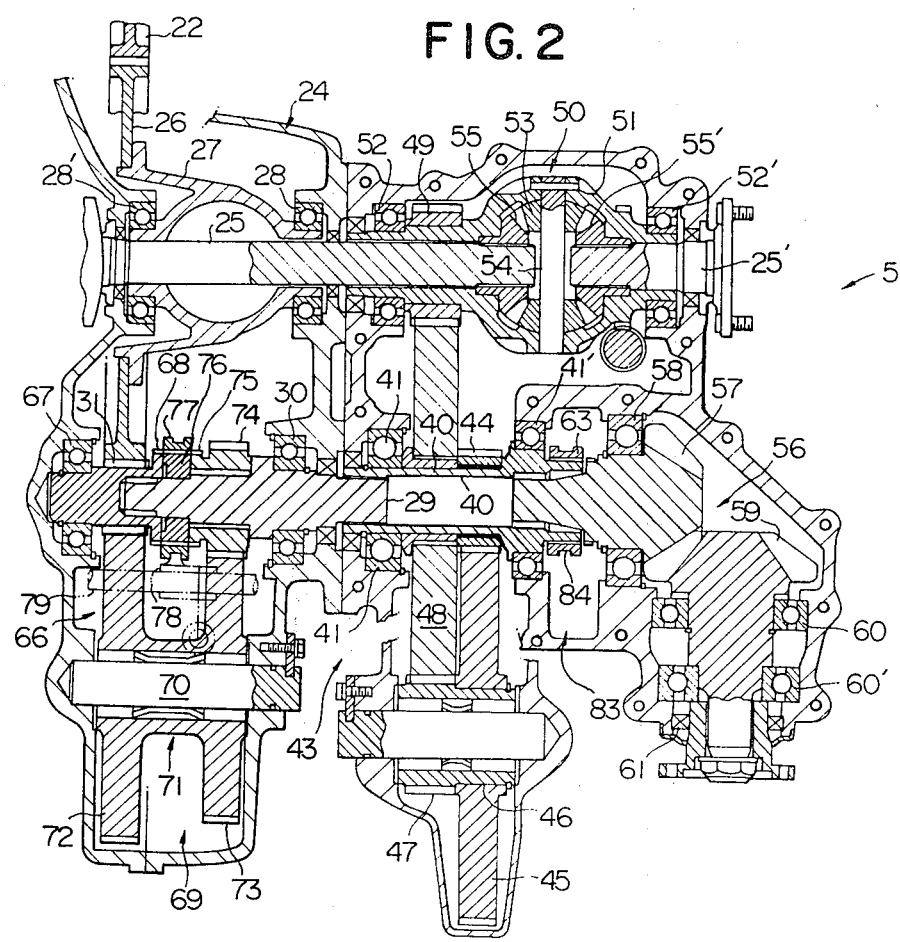

FOUR-WHEEL DRIVE SYSTEM FOR A WHEELED VEHICLE

FIELD OF THE INVENTION

The present invention relates to a drive system for a wheeled vehicle and, particularly, to a four-wheel drive system for a four-wheeled vehicle having at least two pairs of road wheels which consist of a pair of front road wheels and a pair of rear road wheels. More particularly, the present invention relates to a four-wheel drive system including a power unit to be installed on a body structure of a wheeled vehicle with its output shaft oriented in a lateral direction of the vehicle body structure.

BACKGROUND OF THE INVENTION

An example of known vehicle drive systems using laterally positioned power units such as internal combustion engines is disclosed in Japanese Preliminary Publication of Utility Model No. 55-83119. The four-wheel drive system therein taught uses a front-wheel drive differential gear assembly driven by a drive gear held in mesh with an output gear of the power transmission gear unit and with a drive gear for a rear-wheel drive differential gear assembly. The front-wheel differential gear assembly is, thus, operative to drive the drive axles for the front road wheels and to transmit driving power to the rear-wheel differential gear assembly. By reason of the particular arrangement of such a drive system, a low-and-high speed shifting mechanism provided in a prior-art four-wheel drive system of the above described character is required to be incorporated in the gear train included in the power transmission gear unit. Unless the type and design of the power transmission gear unit to be put to use for the four-wheel drive system is equipped with such a low-and-high speed shifting mechanism in the gear train, it is impossible to make a low-and-high speed shifting mechanism to be incorporated in the prior-art four-wheel drive system. The present invention contemplates elimination of these and other problems which have thus far been inherent in prior-art four-wheel drive systems for wheeled vehicles.

SUMMARY OF THE INVENTION

In accordance with the present invention, there is provided a four-wheel drive system for a vehicle having at least two pairs of road wheels consisting of a pair of front road wheels and a pair of rear road wheels, comprising, in combination, a power unit having an output shaft having an axis of rotation in a lateral direction of the vehicle, a power transmission gear unit including transmission input and output shafts each having an axis of rotation in a lateral direction of the vehicle, and gears mounted on the transmission input and output shafts and arranged to be capable of selectively producing a plurality of gear ratios between the transmission input and output shafts, the output shaft of the power unit being operatively coupled to the transmission input shaft, the above mentioned gears including a transmission output gear rotatable with the transmission output shaft; and a power distribution gear unit comprising (a) a power distribution shaft having an axis of rotation in a lateral direction of the vehicle, (b) a power distribution input gear coaxially rotatable with respect to the power distribution shaft, (c) a power transfer gear operatively intervening between the transmission output gear and the power distribution input gar and operative to transmit driving power therethrough from the transmission output shaft to the power distribution shaft, (d) clutch means arranged on said power distribution shaft and arranged to be operative to split into two driving power components the driving power carried to the power distribution shaft, (e) a final reduction gear assembly operative to transmit therethrough one of the driving power components with reduction of speed at a predetermined ratio, (f) a pair of drive shafts axially aligned with each other in a lateral direction of the vehicle and operatively connected to one of the aforesaid paid of front road wheels and the aforesaid pair of rear road wheels, (g) a wheel drive differential gear assembly mounted on the drive shafts, the final reduction gear assembly operatively intervening between the power distribution shaft and the wheel drive differential gear assembly, (h) a right-angle power transfer gear assembly operative to transmit the other of the above mentioned driving power components to the other of said pair of front road wheels and aforesaid pair of rear road wheels, the power transfer gear assembly including a driven gear having an axis of rotation in a fore-and-aft direction of the vehicle, and (i) a low-and-high speed shifting clutch mechanism which comprises a low-speed gear coaxially rotatable on the power distribution shaft, clutch means operative to provide coupling engagement selectively between the power distribution gear and the power distribution shaft and between the low-speed gear and the power distribution shaft, and a reduction gear member which has an axis of rotation substantially parallel with the axis of rotation of the power distribution shaft and which is held in mesh with both of the power distribution input gear and the low-speed gear.

BRIEF DESCRIPTION OF THE DRAWINGS

The features and advantages of a four-wheel drive system according to the present invention will be more clearly appreciated from the following description taken in conjunction with the accompanying drawings in which like reference numerals designate similar or corresponding members, units, assemblies and structures and in which:

FIG. 2 is a sectional view showing, to an enlarged scale, a power distribution gear unit forming part of a the preferred embodiment of the system according to the present invention.

DESCRIPTION OF THE PREFERRED EMBODIMENTS

Figure 1:
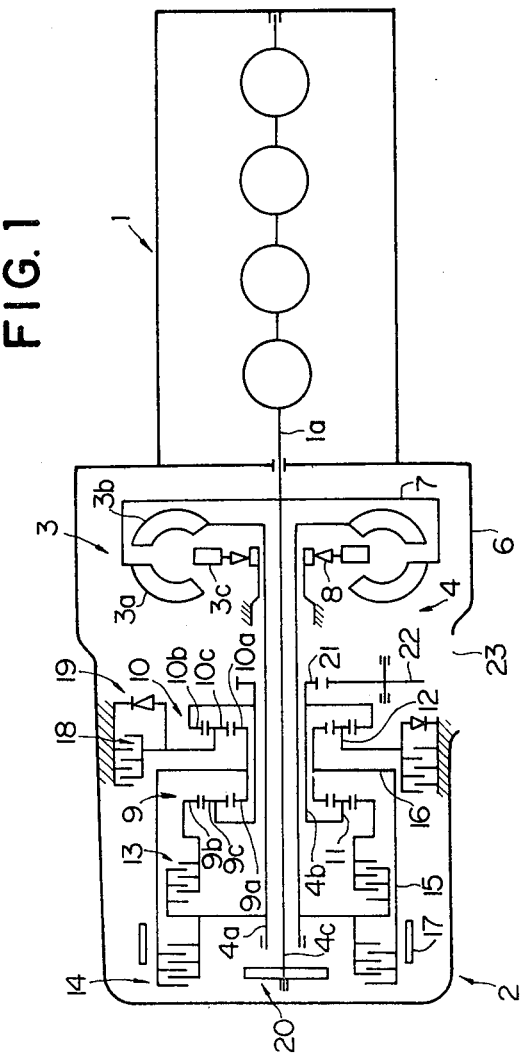
FIG. 1 is a schematic view showing the general construction and arrangement of an example of the combination of a power unit and a power transmission gear unit forming part of a preferred embodiment of the four-wheel drive system according to the present invention.

Description will be hereinafter made in regard to the embodiment of a four-wheel drive system according to the present invention. Referring first to FIGS. 1 and 2 of the drawings, the embodiment of a four-wheel drive system according to the present invention comprises a power unit constituted by, for example, a reciprocating-piston internal combustion engine 1 which is schematically indicated at 1. The engine 1 or any other form of power unit has an output shaft such as a crankshaft 1a of the engine 1. The four-wheel drive system herein proposed features the laterally positioned engine arrangement and, thus, the engine 1 as shown is installed on the chassis of a wheeled vehicle in such a manner that the crankshaft 1a thereof axially extends in a lateral direction of the vehicle body (not shown). Furthermore, the four-wheel drive system embodying the present invention is assumed, by way of example, as being of the front-engine design and, thus, the engine 1 is positioned within a front engine compartment (not shown) of the vehicle. The four-wheel drive system embodying the present invention further comprises a transmission-front-axle or, briefly, transaxle mechanism 2 which largely consists of a hydrodynamic clutch unit 3 and an automatically operated power transmission gear unit 4 which are shown in FIG. 1 and a power distribution gear unit 5 shown in FIG. 2. The clutch unit 3 and the transmission gear unit 4 are enclosed within a transmission causing structure 6. The hydrodynamic clutch unit 3 is herein shown constituted by a three-member torque converter comprising a driving member constituted by a pump impeller 3a, a driven member constituted by a turbine runner 3b and a reaction member constituted by a stator 3c. The pump impeller 3a is connected by a converter drive plate 7 to the crankshaft 1a of the internal combustion engine 1 and is thus rotatable with the engine crankshaft 1a about an axis aligned with the axis of rotation of the crankshaft 1a. The transmission gear unit 4 has a hollow transmission input shaft 4a connected to the turbine runner 3b of the clutch unit or torque converter 3 and rotatable with the turbine runner 3b about an axis also aligned with the axis of rotation of the engine crankshaft 1a. The stator 3c of the torque converter 3 is positioned between the pump impeller 3a and turbine runner 3b and is connected to the transmission casing structure 6 through a torque-converter one-way clutch assembly 8.

On the other hand, the power transmission gear unit 4 is assumed, by way of example, as being of the three-forward-speed and one-reverse speed type and is thus shown comprising a hollow transmission output shaft 4b and a gear train consisting of two planetary gear assemblies which are arranged in series with each other on the transmission output shaft 4b. The transmission output shaft 4b has coaxially enclosed therein an intermediate axial portion of the transmission input shaft 4a.

The two planetary gear assemblies on the transmission output shaft 4b consist of a first planetary gear assembly 9 and a second planetary gear assembly 10. The first planetary gear assembly 9 comprises an externally toothed sun gear 9a coaxially rotatable on the transmission output shaft 4b, an internally toothed ring gear 9b coaxially surrounding the sun gear 9a, and at least two planet pinions 9c each held in mesh with the sun gear 9a and the ring gear 9b and rotatable about the common axis of rotation of the sun and ring gears 9a and 9b. Similarly, the second planetary gear assembly 10 comprises an externally toothed sun gear 10a coaxially rotatable on the transmission output shaft 4b, an internally toothed ring gear 10b coaxially surrounding the sun gear 10a, and at least two planet pinions 10c each held in mesh with the sun gear 10a and the ring gear 10b and rotatable about the common axis of rotation of the sun and ring gears 10a and 10b. The planet pinions 9c of the first planetary gear assembly 9 are securely connected together by a first pinion carrier 11 while the planet pinions 10c of the second planetary gear assembly 10 are securely connected together by a second pinion carrier 2. The planet pinions of each of the first and second planetary gear assemblies 9 and 10 are, thus, not only rotatable about the respective axes of rotation thereof but also revolvable about the common axis of rotation of the sun and ring gears of the planetary gear assembly while rolling around the sun gear or ring gear of the gear assembly, as is well known in the art.

The power transmission gear unit 4 further comprises two transmission clutch assemblies positioned in series with each other in a direction in which the transmission output shaft 4b extends. The two transmission clutch assemblies consist of a forward-drive clutch assembly 13 to be actuated to select any of the first, second and third forward-drive gear ratios, and a high-and-reverse clutch assembly 14 to be actuated to select the third forward-drive gear ratio or the reverse-drive gear ratio. The forward-drive clutch assembly 13 has input members constituted by clutch plates coaxially rotatable with the transmission input shaft 4a, and output members constituted by clutch discs and coaxially rotatable with the ring gear 9b of the first planetary gear assembly 9. On the other hand, the high-and-reverse clutch assembly 14 has input members constituted by clutch discs coaxially rotatable with the transmission input shaft 4a, and output members constituted by clutch plates and coaxially rotatable with the respective sun gears 9a and 10a of the first and second planetary gear assemblies 9 and 10 through a clutch drum 15 and a connecting shell 16 as shown. The clutch drum 15 is coaxially surrounded by a second-speed brake band 17 to apply brakes to the drum 15 and accordingly to the sun gears 9a and 10a for selecting the second forward-drive gear ratio.

The power transmission gear unit 4 further comprises a low-and-reverse brake assembly 18 having stationary members constituted by brake plates secured to the transmission casing structure, and rotatable members constituted by brake discs coaxially rotatable with the second pinion carrier 12. The low-and-reverse brake assembly 18 is adapted to select the first forward-drive gear ratio or the reverse-drive gear ratio. The low-and-reverse brake assembly 18 is associated in effect with a transmission one-way clutch assembly 19 which comprises a stationary member constituted by an outer race member fixedly connected to the transmission casing structure 6 and a rotatable member constituted by an inner race member coaxially rotatable with the second pinion carrier 12 and the rotatable members or brake discs of the low-and-reverse brake assembly 18. The transmission one-way clutch assembly 19 further comprises a series of spring loaded coupling elements (not shown) annularly disposed between the inner and outer race members of the clutch assembly 19. The coupling elements of the clutch assembly 19 are arranged in such a manner as to permit the rotatable inner race member of the clutch assembly 19 to rotate about the axis of rotation of the transmission input shaft 4a only in a "forward" direction identical with the direction of rotation of the transmission input shaft 4a. The pinion carrier 11 of the first planetary gear assembly 9 and the ring gear 10b of the second planetary gear assembly 10 are jointly connected to and coaxially rotatable with the transmission output shaft 4b.

The power transmission gear unit 4 shown in FIG. 1 further comprises a transmission oil pump assembly 20 mechanically connected to and driven by the crankshaft 1a of the internal combustion engine 1 through a pump drive shaft 4c axially extending through the hollow transmission input shaft 4a in line with the axis of rotation of the engine crankshaft 1 as shown. The pressurized fluid delivered from the oil pump assembly 20 is not only fed as a control fluid to the respective actuating or servo means for the individual fluid-operated friction devices of the transmission gear unit 4 but is also supplied as a working fluid to the torque converter 3.

The construction and arrangement of the torque converter 3 and the transmission gear unit 4 as hereinbefore described and shown in FIG. 1 is simply by way of example and may be modified and/or changed in numerous manners.

The output shaft 4b of the transmission gear unit 4 has fixedly mounted thereon a transmission output gear 21 which is coaxially rotatable with the transmission output shaft 4b and which is located, by way of example, intermediate between the torque converter 3 and the gear train consisting of the first and second planetary gear assemblies 9 and 10 as shown. The transmission output gear 21 is held in mesh with an intermediate idler gear 22 which operatively intervenes between the transmission gear unit 4 and the power distribution gear unit 5 (FIG. 2) through an opening 23 formed in the transmission casing structure 6. The intermediate idler gear 22 is rotatably mounted on a shaft having axially opposite extensions or bosses respectively journaled in suitable bearings securely attached to the transmission casing structure 6.

As shown to an enlarged scale in FIG. 2, the power distribution gear unit 5 has a hollow axle casing structure 24 securely connected to or integral with the transmission casing structure 6 (FIG. 1) and comprises two, left-side and right-side, front-wheel drive shafts 25 and 25' which are aligned with each other and which extend in parallel with the crankshaft 1a of the internal combustion engine 1 (FIG. 1), viz., in a lateral direction of the vehicle body. The power distribution gear unit 5 further comprises a power transfer gear 26 which is held in mesh with the above mentioned intermediate idler gear 22 through the opening 23 formed in the transmission casing structure 6 as shown in FIG. 1. The power transfer gear 26 of the power distribution gear unit 5 is securely connected to and coaxially rotatable with a gear carrier 27 having rotatably passed therethrough the left-side front-wheel drive shaft 25 as shown. The gear carrier 27 has axially opposite hub portions respectively journaled in bearings 28 and 28' mounted on the axle casing structure 24.

The power distribution gear unit 5 further comprises an intermediate power distribution shaft 29 extending in parallel with the front-wheel drive shafts 25 and 25' and a low-and-high speed shifting clutch mechanism 66. The clutch mechanism 66 comprises a power distribution input gear 31 held in mesh with the power transfer gear 26. The input gear 31 has an axial boss portion journaled in a bearing 67 supported on the axle housing structure 24 and is formed with a blind axial bore which is axially open toward the power distribution shaft 29. The power distribution shaft 29 in turn has a pilot end portion rotatably received in the blind axial bore in the power distribution input gear 31 so that the shaft 29 and the gear 31 are rotatable with respect to each other about the aligned center axes thereof. Furthermore, the power distribution input gear 31 has an externally serrated disc portion 68 coaxially surrounding the pilot end portion of the power distribution shaft 29.

With the power distribution shaft 29 and the input gear 31 thus arranged, the above mentioned low-and-high speed shifting clutch mechanism 66 comprises a speed reduction gear assembly 69 comprising a reduction gear shaft 70 axially extending in parallel with the power distribution shaft 29 and having opposite axial end portions supported on the axle casing structure 24. The reduction gear shaft 70 has rotatably carried thereon a unitary gear member 71 having first and second reduction gear portions 72 and 72 which are axially spaced apart from each other on the shaft 70 and which are larger in diameter than the power distribution input gear 31 as shown. The first reduction gear portion 72 is held in mesh with the power distribution gear 31 and the second reduction gear portion 73 is held in mesh with a low-speed gear 74 rotatably mounted on an axial portion of the power distribution shaft 29. The low-speed gear 74 has an externally serrated disc portion 75 axially projecting toward the externally serrated disc portion 68 of the power distribution input gear 31. Between the externally serrated disc portions 68 and 75 of the gears 31 and 74, respectively, is positioned a ring-shaped, externally serrated sleeve carrier 76 which is fixedly mounted on the power distribution shaft 29 adjacent the pilot end portion of the shaft 29 as shown. The external serrations of the sleeve carrier 76 are axially aligned with the external serrations of both of the serrated disc portions 68 and 75 of the gears 31 and 74, respectively. A coupling sleeve 77 having an inner wall formed with internal serrations is splined to the externally serrated sleeve carrier 76 and is thus axially movable on the sleeve carrier 76 selectively in one direction for engagement with the externally serrated disc portion 68 of the power distribution input gear 31 and in the other direction for engagement with the externally serrated disc portion 75 of the low-speed gear 74. The coupling sleeve 77 has an outer peripheral wall formed with a circumferential groove through which a shifting fork 78 indicated by dot-and-dash lines in FIG. 2 is held in engagement with the coupling sleeve 77. The shifting fork 78 in turn is connected through a mechanical linkage 79 to suitable manually or otherwise operated low-and-high speed shift control means (not shown).

The power distribution gear unit 5 shown in FIG. 2 further comprises an externally serrated hollow shaft 40 coaxially secured to an inner axial end portion of the power distribution shaft 29. The hollow shaft 40 has axial end portions respectively journaled in bearings 41 and 41' mounted on the axle casing structure 24. The hollow shaft 40 forms part of a front-wheel driveline which further comprises a front final reduction gear assembly 43. In the embodiment herein shown, the front final reduction gear assembly 43 comprises an externally toothed ring gear 44 having an inner peripheral wall formed with internal serrations and thus splined to the externally serrated hollow shaft 40. The ring gear 44 is held in mesh with a first reduction gear 45 larger in diameter than the ring gear 44 and coaxially rotatable on a hollow reduction gear shaft 46 extending in parallel with the power distribution shaft 29. The first reduction gear 45 is securely attached to or integral with a second reduction gear 47, which is thus coaxially rotatable with the first reduction gear 45 on the reduction gear shaft 46 and which is smaller with a predetermined ratio in diameter than the first reduction gear 45. The reduction gear shaft 46 has opposite axial end portions secured to the axle casing structure 24 by suitable fastening means as shown. The second reduction gear 47 is held in mesh with an idler gear 48 rotatably mounted on the hollow shaft 40 and located between the bearing 41 and the ring gear 44. The idler gear 48 in turn is held in mesh with an externally toothed ring gear 49 which is disposed to be rotatable about the axis of rotation of the left-side front-wheel drive shaft 25.

The front-wheel driveline thus comprising the hollow shaft 40, ring rear 44, first and second reduction gears 45 and 47, idler gear 48 and ring gear 49 terminates in the left-side and right-side front-wheel drive shafts 25 and 25' through a front-wheel differential gear assembly 50 mounted on the drive shafts 25 and 25'. The front-wheel drive differential gear assembly 50 comprises a hollow differential housing 51 having opposite axial extensions respectively formed with bores and journaled in bearings 52 and 52' mounted on the axle casing structure 24. The left-side axial extension of the housing 51 has an outer peripheral wall formed with external serrations. The ring gear 49 is thus splined to the externally splined left-side axial extension of the differential housing 51, which is accordingly rotatable with the ring gear 49 on an inner axial end portion of the left-side front-wheel drive shaft 25. The differential housing 51 has enclosed therein two pairs of differential bevel pinions 51 which are rotatably mounted on two pinion cross shafts 54 secured to the differential housing 51 and extending at right angles to each other and to the axis of rotation of the differential housing 51 as will be seen from FIG. 2 in which only two of the four bevel pinions 53 are shown mounted on one of the two cross shafts 54. The individual bevel pinions 53 are, thus, rotatable not only together with the differential housing 51 and the cross shafts 54 about the respective axes of rotation of the drive shafts 25 and 25' but also independently of one another about the respective center axes of the cross shafts 54, viz., axes perpendicular to the axis of rotation of the differential housing 51. The four differential bevel pinions 53 intervene between a pair of differential side bevel gears 55 and 55' which are also enclosed within the differential housing 51 and which are securely mounted on inner axial end portions of the front-wheel drive shafts 25 and 25', respectively. The side bevel gears 55 and 55' are held in mesh with the bevel pinions 53 and are rotatable about the respective axes of rotation of the front-wheel drive shafts 25 and 25'. The drive shafts 25 and 25' are aligned with each other in a lateral direction of the vehicle body and axially extend in opposite directions away from the cross shafts 54 through the axial bores in the bevel gears 55 and 55', respectively, and through the bores in the left-side and right-side extensions, respectively, of the differential housing 51. The drive shafts 25 and 25' are operatively connected to the drive axles for left-side and right-side front road wheels, respectively, through suitable coupling means such as constant-velocity joints, though not shown in the drawings.

The power distribution gear unit 5 further comprises a right-angle power transfer gear assembly 56 which forms part of a rear-wheel driveline. The right-angle power transfer assembly 56 comprises a driving bevel gear 57 axially aligned with the power distribution shaft 29 and having an axial stem portion terminating in proximity to the inner axial end of the power distribution shaft 29 as shown. The drive bevel gear 57 has its stem portion journaled in a bearing 58 and rotatably received in an axial end portion of the bore in the previously described hollow shaft 40 on the power distribution shaft 29 as shown. The drive bevel gear 57 is held in mesh with a driven bevel gear 59 having an axis of rotation at right angles to the axis of rotation of the drive bevel gear 57, viz., in a fore-and-aft direction of the vehicle body. The driven bevel gear 59 has an axial stem portion journaled in two bearings 60 and 60' mounted on the axle casing structure 24 as shown. The right-angle power transfer assembly 56 thus composed of the drive and driven bevel gears 57 and 59 is adapted to convert the rotation of the drive bevel gear 57 into rotation about an axis perpendicular to the axis of rotation of the drive bevel gear 57. The axial stem portion of the driven bevel gear 59 projects rearwardly from the axle casing structure 24 through an opening 61 formed in the axle casing structure 24. Though not shown in the drawings, the rear-wheel driveline comprising the right-angle power transfer gear assembly 56 constructed and arranged as hereinbefore described further comprises a propeller shaft extending in a fore-and-aft direction of the vehicle body and connected at its foremost end to the above described driven bevel gear 59 through suitable coupling means, a rear final reduction gear unit including a rear-wheel drive differential gear assembly, and a pair of rear-wheel drive shafts extending from the differential gear assembly to drive axles for rear road wheels, respectively, also through suitable coupling means.

The power distribution gear unit 5 further comprises a two-wheel/four-wheel shifting clutch mechanism 83 which is adapted to have the above mentioned drive bevel gear 57 and accordingly the rear driveline of the drive system disengaged from the power distribution shaft 29. For this purpose, the hollow shaft 40 bridging the power distribution shaft 29 and the drive bevel gear 57 of the right-angle power transfer gear assembly 56 has an axial end portion formed with external serrations and, likewise, the axial stem portion of the drive bevel gear 57 has an outer peripheral wall formed with external serrations which are axially aligned with the external serrations of the hollow shaft 40. A coupling sleeve 84 having an inner peripheral formed with internal serrations is splined to the serrated portion of the hollow shaft 40 and is axially movable thereon into or out of engagement with the externally serrated stem portion of the drive bevel gear 57. The coupling sleeve 84 has an outer peripheral wall formed with a cicumferential groove through which a shifting fork (not shown) is held in engagement with the coupling sleeve 84. Though not shown in the drawings, the shifting fork in turn is connected through a mechanical linkage to suitable manually or otherwise operated two-wheel/four-wheel shift control means.

Description will be hereinafter made with reference to FIGS. 1 and 2 in regard to the operation of the four-wheel drive system which is thus constructed and arranged.

When the internal combustion engine 1 is in operation, the driving power delivered from the crankshaft 1a of the engine 1 is transmitted by the torque converter 3 to the input shaft 4a of the power transmission gear unit 4, driving the transmission input shaft 4a for rotation in one direction about the axis thereof. If, under these conditions, the power transmission gear unit 4 is held in a condition having the neutral gear ratio selected therein, all the friction devices such as the clutches 13 and 14, brake band 17 and brake 18 included in the transmission gear unit 4 are maintained in the inoperative conditions thereof so that the transmission input shaft 4a is driven for rotation without imparting a driving power to the transmission output shaft 4b. The transmission output shaft 4b is therefore held at rest and accordingly no driving power is transmitted from the power transmission gear unit 4 to the power distribution gear unit 5.

If, however, any two of the friction devices in the power transmission gear unit 4 are held in the operative conditions thereof, any one of the first, second and third forward-drive gear ratios or the reverse-drive gear ratio is established in the transmission gear unit 4. Under these conditions, the driving power delivered from the engine crankshaft 1a to the transmission input shaft 4a by way of the torque converter 3 is transmitted through the combination of some of the component gears of the two planetary gear assemblies 9 and 10 to the transmission output shaft 4b. The transmission output shaft 4b is thus driven for rotation at a revolution speed proportioned with the selected gear ratio to the revolution speed of the transmission input shaft 4a. The rotation of the transmission output shaft 4b is transmitted through the transmission output gear 21 and further through the intermediate idler gear 22 and the power transfer gear 26 to the input gear 31 of the power distribution gear unit 5.

When, now, the shifting fork 78 is held in a position having the coupling sleeve 77 engaged by both of the sleeve carrier 76 and the serrated disc portion 75 of the low-speed gear 74, the power distribution input gear 31 is disengaged from the coupling sleeve 77. As a consequence, the driving power carried from the power transmission gear unit 4 (FIG. 1) to the power distribution input gear 31 by way of the intermediate idler gear 22 (FIG. 1) and the power transfer gear 26 is transmitted to the power distribution shaft 29 through the first and second reduction gear portions 72 and 73 of the gear member 71, the low-speed gear 74, the coupling sleeve 77 and the sleeve carrier 76. Accordingly, the driving power transmitted from the power distribution input gear 31 to the power distribution shaft 29 is reduced in speed by means of the first and second reduction gear portions 72 and 73 of the gear member 71. Under these conditions, the front and rear road wheels of the vehicle are driven for rotation at reduced speed and with increased driving torque. When the shifting fork 78 is actuated to move the coupling sleeve 77 for engagement with the serrated disc portion 68 of the power distribution input gear 31, the power distribution input gear 31 is held in engagement with the sleeve carrier 76 through the coupling sleeve 77 so that the driving power carried to the input gear 31 is transmitted to the power distribution shaft 29 through the serrated disc portion 68 of the gear 31, the coupling sleeve 77 and the sleeve carrier 76. Under these conditions, the power distribution shaft 29 is driven for rotation with the power distribution input gear 31 so that the front and rear road wheels are driven for rotation at an increased speed and with a reduced driving torque.

The driving power thus carried to the input gear 31 of the power distribution gear unit 5 is further transmitted through the power distribution shaft 29 to the hollow shaft 40 on the shaft 29. If, in this instance, the coupling sleeve 84 on the axial end portion of the hollow shaft 40 is held in an axial position engaged with the externally serrated stem portion of the drive bevel gear 57 of the right-angle power transfer gear assembly 56, the driving power transmitted to the hollow shaft 40 is split into two driving power components, one of which is transmitted from the hollow shaft 40 to the externally toothed ring gear 44 of the final reduction gear assembly 43 and the other of which is transmitted from the hollow shaft 40 to the drive bevel gear 57 of the right-angle power transfer gear assembly 56. The driving power transmitted to the ring gear 44 is further transmitted through the first reduction gear 45, hollow reduction gear shaft 46, second reduction gear 47, idler gear 48 and ring gear 49 to the differential housing 51 of the front-wheel drive differential gear assembly 50. The driving power thus transmitted to the differential housing 51 is reduced in speed by means of the front final reduction gear assembly 43 composed of the first and second reduction gears 45 and 47. In the differential gear assembly 50, the differential housing 51 is thus driven for rotation about the aligned axis of rotation of the front-wheel drive shafts 25 and 25' and drives the differential bevel pinions 53 for rotation also about the axes of rotation of the drive shafts 25 and 25'. The bevel pinions 53 of the differential gear assembly 50 split the input driving power into two driving power components, one of which is transmitted from the bevel pinions 53 to the left-side bevel gear 55 and the other of which is transmitted from the bevel pinions 53 to the right-side bevel gear 55'. The driving power thus transmitted to of the left-side and right-side bevel gears 55 and 55' is further transmitted through the left-side and right-side front-wheel drive shafts 25 and 25' and the previously mentioned coupling means to the left-side and right-side front wheel axles, respectively, and drives the front road wheels for rotation about the respective center axes thereof.

Under these conditions, the driving power transmitted through the power distribution shaft 29 to the hollow shaft 40 on the shaft 29 is transmitted not only to the front final reduction gear assembly 43 as described above but to the drive bevel gear 57 of the right-angle power transfer gear assembly 56 through the coupling sleeve 84 and from the drive bevel gear 57 to the driven bevel gear 59 of the gear assembly 56. The rotation of the driven bevel gear 59 is transmitted by way of the previously mentioned propeller shaft and coupling means to the rear final reduction gear unit and is split by the differential gear assembly of the unit into two driving power components driving the rear-wheel drive shafts. The drive axles for the left-side and right-side rear road wheels are thus also driven for rotation about the respective center axes thereof.

If, on the other hand, the coupling sleeve 84 of the two-wheel/four-wheel shifting clutch mechanism 83 is held in a position disengaging the drive bevel gear 57 of the right-angle power transfer gear assembly 56, the driving power transmitted through the power distribution shaft 29 to the hollow shaft 40 on the shaft 29 is transmitted to the front final reduction gear assembly 43 as described above but not transmitted to the drive bevel gear 57 of the right-angle power transfer gear assembly 56 through the coupling sleeve 84. The rotation of the driven bevel gear 59 is not transmitted by way of the previously mentioned propeller shaft and coupling means to the rear final reduction gear unit. The drive axles for the left-side and right-side rear road wheels are thus not driven for rotation about the respective center axes thereof.

While it has been assumed that the power unit in the embodiment hereinbefore described is constituted by an internal combustion engine positioned in the front engine compartment, the power unit of a four-wheel drive system according to the present invention may be constituted by a laterally-positioned internal combustion engine of the midship type or may be installed in a rear portion of the vehicle body. In this instance, the power transfer gear 26 of the power distribution gear unit 5 may be located above the front or rear left-side and right-side wheel axles.

What is claimed is:

1. A four-wheel drive system for a vehicle having at least two pairs of road wheels consisting of a pair of front road wheels and a pair of rear road wheels, comprising in combination:

a power unit having an output shaft having an axis of rotation in a lateral direction of the vehicle, a power transmission gear unit including transmission input and output shafts each having an axis of rotation in a lateral direction of the vehicle, and gears mounted on the transmission input and output shafts and arranged to be capable of selectively producing a plurality of gear ratios between the transmission input and output shafts, the output shaft of the power unit being operatively coupled to the transmission input shaft, said gears including a transmission output gear rotatable with the transmission output shafts; and a power distribution gear unit comprising (a) a power distribution shaft having an axis of rotation in a lateral direction of the vehicle, (b) a power distribution input gear coaxially rotatable with respect to the power distribution shaft, (c) an intermediate power transfer gear operatively intervening between the transmission output gear and the power distribution input gear and operative to transmit driving power therethrough from the transmission output shaft to the power distribution shaft, (d) two-wheel/four-wheel shifting clutch means arranged on said power distribution shaft and operative to split into two driving power components the driving power carried to the power distribution shaft, (e) a final reduction gear assembly operative to transmit therethrough one of said driving power components with reduction of speed at a predetermined ratio, (f) a pair of drive shafts axially aligned with each other in a lateral direction of the vehicle and operatively connected to one of said pair of front road wheels and said pair of rear road wheels, (g) a wheel drive differential gear assembly mounted on said drive shafts, said final reduction gear assembly operatively intervening between said two-wheel/four-wheel shifting clutch means and said wheel drive differential gear assembly, (h) a right-angle power transfer gear assembly operative to transmit the other of said driving power components to the other of said pair of front road wheels and said pair of rear road wheels, said right-angle power transfer gear assembly including a driven gear having an axis of rotation in a fore-and-aft direction of the vehicle, and (i) a low-and-high speed shifting clutch mechanism which comprises a low-speed gear coaxially rotatable on the power distribution shaft, clutch means operative to provide coupling engagement selectively between the power distribution input gear and the power distribution shaft and between said low-speed gear and the power distribution shaft, and a reduction gear assembly which has an axis of rotation substantially parallel with the axis of rotation of said power distribution shaft and which is held in mesh with both of the power distribution input gear and said low-speed gear.

2. A four-wheel drive system as set forth in claim 1, in which said final reduction gear assembly comprises an externally toothed ring gear coaxially rotatable with said power distribution shaft, a first reduction gear held in mesh with said ring gear and rotatable about an axis fixed with respect to and substantially parallel with said power distribution shaft, a second reduction gear coaxially rotatable with and smaller in diameter than said first reduction gear and a ring gear held in engagement with said second reduction gear and in driving engagement with said wheel drive differential gear assembly.

3. A four-wheel drive system as set forth in claim 2, in which said power distribution input gear and said power distribution shaft are rotatable with respect to each other about the aligned axes of rotation thereof and in which said power distribution input gear has an externally serrated disc portion which is coaxial with respect to the power distribution shaft, said low-and-high speed shifting clutch mechanism comprising an externally toothed low-speed gear coaxially rotatable with said power distribution shaft and having an externally serrated disc portion axially aligned with and spaced apart from the externally serrated disc portion of said power distribution input gear, a unitary gear member which is rotatable about an axis fixed with respect to and substantially parallel with said power distribution shaft and which has a first gear portion held in mesh with said power distribution input gear and a second gear portion held in mesh with said low-speed gear, an externally serrated sleeve carrier located axially between the respective serrated disc portions of the power distribution input gear and said low-speed gear and coaxially rotatable with said power distribution shaft, and an internally serrated coupling sleeve splined to said sleeve carrier and axially movable on the sleeve carrier selectively in one direction for engagement with the power distribution input gear and in the other direction for engagement with the low-speed gear.

4. A four-wheel drive system as set forth in any one of claims 1 to 3, in which said two-wheel/four-wheel shifting clutch operatively intervenes between said power distribution shaft and said right-angle power transfer gear assembly.

5. A vehicle drive system as set forth in claim 1, which further comprises an intermediate idler gear held in mesh with said transmission output gear and said intermediate power transfer gear.

* * * * *